July 24, 1934.　　R. A. GOEPFRICH　　1,967,403
BRAKE
Filed April 27, 1931　　2 Sheets-Sheet 1

INVENTOR.
RUDOLPH A. GOEPFRICH
BY
ATTORNEY

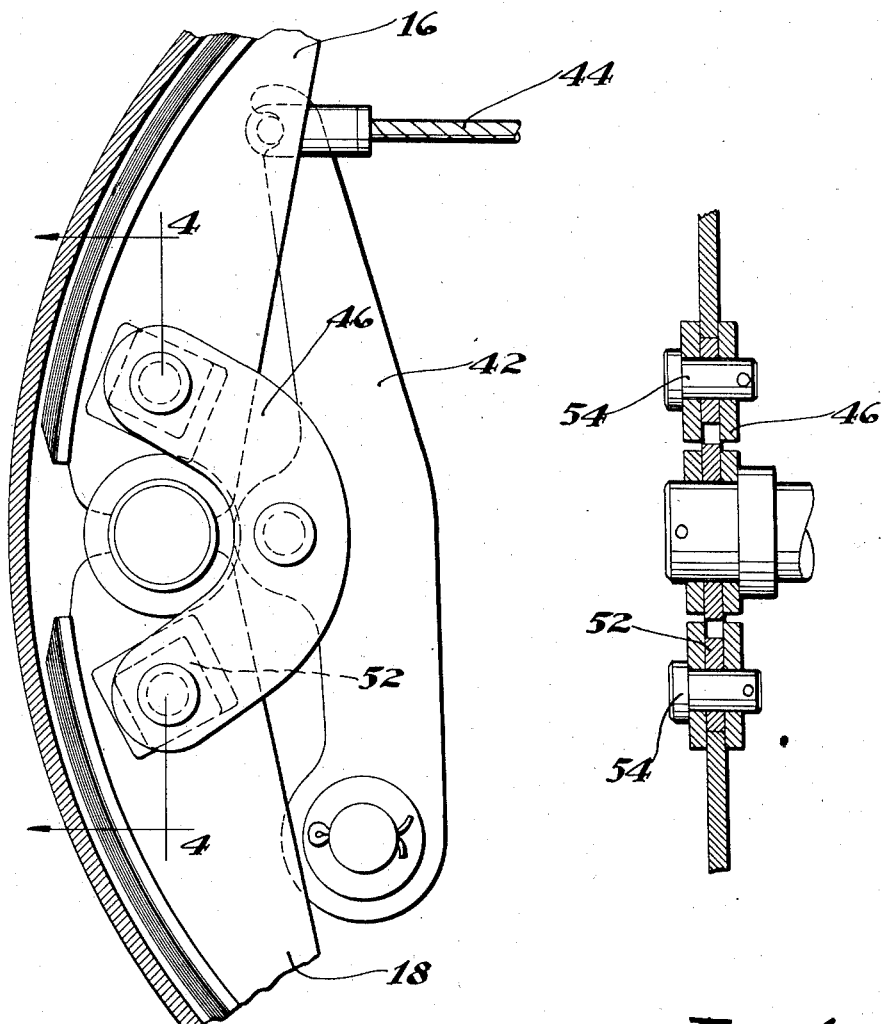

Patented July 24, 1934

1,967,403

UNITED STATES PATENT OFFICE 1,967,403

BRAKE

Rudolph A. Goepfrich, South Bend, Ind., assignor to Bendix Brake Company, South Bend, Ind., a corporation of Illinois Application April 27, 1931, Serial No. 533,249

10 Claims. (Cl. 188—78)

This invention relates to internal expanding brakes and more particularly to applying means therefor.

Broadly, the invention comprehends a brake having a friction element including a split band and means for moving the band into drum engagement including a simple floating cam arranged to equalize the applied force on both shoes and which is adaptable for cable control.

An important feature of the invention is the arrangement of an operating means for a brake wherein an increased bearing surface may be obtained on the cam blocks and the resultant cam pressure against the blocks is in a direction longitudinal to the drum surface.

An object of the invention is to provide a simple floating cam for operating the friction element of a brake with an equal distribution of the applied force.

A further object of the invention is to provide an operating means including an operating cam adaptable for cable control.

Yet a further object of the invention is to provide an operating means including pressure blocks and means for applying force to the blocks in a direction longitudinally to the braking surface of the drum.

Other objects of the invention will appear from the following description taken in connection with the drawings which form a part of this specification, and in which:

Figure 3 is a sectional view of a portion of a brake illustrating a modified form of the applying means, and Figure 4 is a section taken substantially on line 4—4, Figure 3.

Figure 1:
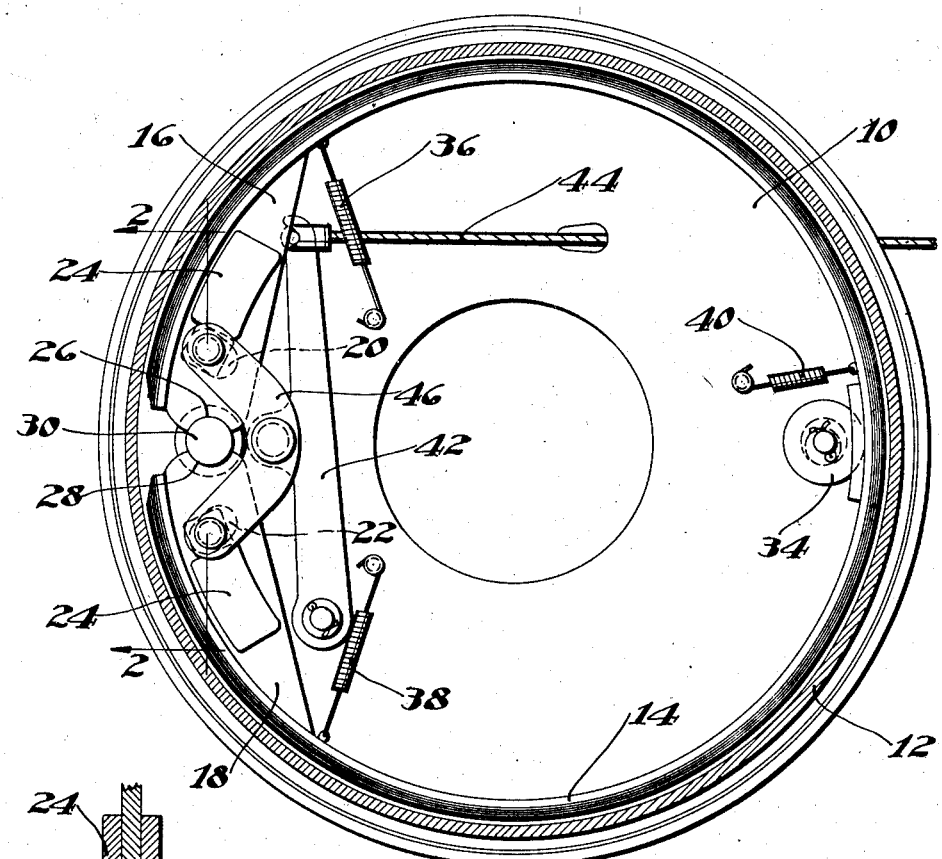
Figure 1 is a vertical sectional view of a brake taken just back of the head of the drum illustrating the friction element in side elevation and showing the invention as applied.
Figure 2:
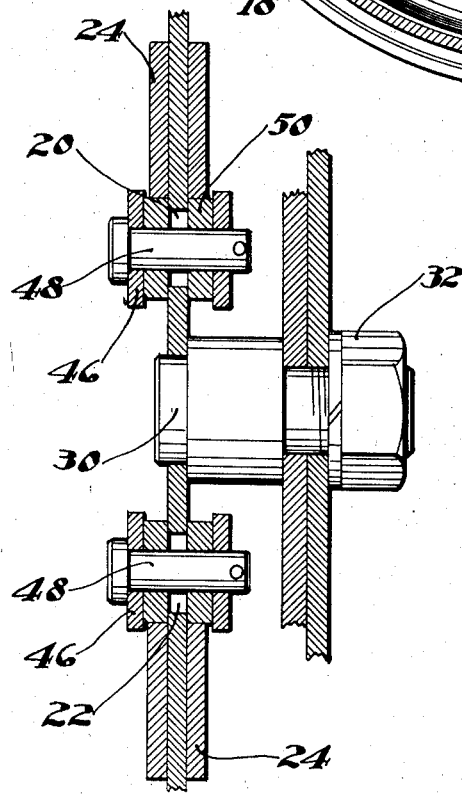
Figure 2 is a sectional view substantially on line 2—2, Figure 1.

Referring to the drawings for more specific details of the invention, 10 represents a fixed support such as a backing plate. The support has associated therewith a rotatable drum 12 which may be secured to a wheel, not shown.

Positioned for movement on the backing plate is a friction element including a split band 14. As shown, the separable ends of the band have webs 16 and 18 provided with corresponding slots 20 and 22, and spot-welded or otherwise secured to the sides of the webs are reinforcing plates 24. The edges of these reinforcing plates are set back from the wall defining the slot, the object of which will hereinafter appear.

The webs are also provided with notches 26 and 28 adapted to embrace an anchor 30 positioned on the backing plate and suitably secured against displacement as by a nut 32 threaded on the anchor. The band 14 is retained when in the off position against the anchor and a suitable adjustable stop 34 by return springs 36 and 38 and an auxiliary return spring 40 connected between the band 16 and a suitable support on the backing plate.

Pivoted on the backing plate is a lever 42 connected by a suitable tension member 44 to a source of power, not shown. The lever has pivoted thereto corresponding registering yokes 46. The arms of the yokes 46 straddle the webs 16 and 18 on the band 14 and passing through the arms are bolts 48 on which are positioned blocks 50 arranged on the opposite sides of the webs and adapted to bear against the reinforcing plates.

A modification of the invention is illustrated in Figures 3 and 4, wherein the webs 16 and 18 are slotted to receive thrust blocks 52 and the arms of the yokes straddle the webs and pins 54 pass through the arms and the blocks.

In this modification of the invention, force is applied through thrust blocks 52 direct to the web and in line therewith, whereas in the preferred form thrust is applied to the reinforcing plates 24 spot-welded or otherwise secured to the web of the shoe.

In both the preferred and modified forms of the invention, force is applied to the tension member 44 to actuate the lever 42, whereupon the yoke 46 is actuated to move the blocks 50 or 52 as the case may be, against the reinforcing plates on the webs of the friction element or against the web of the friction element, to effectively spread the separable ends of the friction element into drum engagement.

In the preferred form, there is an increased bearing surface at the cam blocks, and in either the preferred form or the modification, the resultant cam pressure on the separable ends of the friction element is longitudinally to the braking surface of the drum.

The invention provides for a simple floating operating means affording an equal distribution of applied force to both ends of the friction element and is readily adaptable for cable control.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction device having separable ends, a yoke having parts extending through said ends and having sliding engagement with the separable ends and having a circumferential component of thrust thereagainst, and means for moving the yoke to spread the ends.

2. A brake comprising a friction device having separable ends and means for applying the friction device including a yoke having parts extending through said ends and having sliding engagement with the separable ends and having a circumferential component of thrust thereagainst, and a lever for actuating the yoke.

3. A brake comprising a friction device having separable ends provided with slots, thrust blocks in the slots, a member connecting the thrust blocks and a member for applying force to the member connecting the blocks.

4. A brake comprising a friction element having separable ends provided with diverging slots, thrust members positioned for movement in the slots, a yoke connecting the thrust members and a lever for operating the yoke.

5. A brake comprising a friction element having separable ends provided with oppositely arranged diverging slots, thrust blocks positioned for movement in the slots, a yoke pivotally connecting the thrust blocks and a lever pivotally connected to the yoke.

6. A brake comprising a friction element having separable ends provided with oppositely arranged diverging slots, thrust blocks positioned for movement in the slots, a yoke pivotally connecting the blocks, a lever pivotally connected to the yoke and means for applying force to the lever.

7. A brake comprising a friction element having separable ends provided with webs having oppositely arranged diverging slots, reinforcing plates on the webs adjacent the slots, thrust blocks on the webs spanning the slots, a yoke connecting the thrust blocks, a lever pivoted to the yoke, and a tension member for operating the lever.

8. A brake comprising a friction element having separable ends provided with webs having diverging slots, reinforcing plates on opposite sides of the web adjacent the slots, thrust members positioned on opposite sides of the plates spanning the slots and engaging the reinforcing plates, yokes straddling the webs and pins passing through the yokes and blocks, a lever pivoted to the yoke and means for moving the lever.

9. A brake comprising a fixed support, a rotatable drum associated therewith, a friction element having separable ends arranged on the support and adaptable for cooperation with the drum, webs on the separable ends of the friction element having diverging slots arranged adjacent the separable ends of the friction element, reinforcing plates on the webs adjacent the slots, thrust blocks on the webs spanning the slots, and engaging the plates, yokes having their respective ends connected to the blocks by transverse pins passing through the slots, a lever on the fixed support pivoted between the yokes and a tension member connected to the lever.

10. A brake comprising a fixed support, a rotatable drum associated therewith, a friction element having separable ends positioned for movement on the support and adaptable for cooperation with the drum, webs on the separable ends of the friction elements having oppositely disposed diverging slots, reinforcing members on opposite sides of the webs adjacent the slots, thrust blocks on opposite sides of the webs spanning the slots and engaging the reinforcing plates, corresponding yokes having their free ends pivoted to the blocks by transverse pins passing through the slots, a lever pivoted on the backing plate and connected between the yokes and means for actuating the lever.

RUDOLPH A. GOEPFRICH.